(12) United States Patent
Hugo

(10) Patent No.: US 11,712,132 B1
(45) Date of Patent: Aug. 1, 2023

(54) CUTTING BOARD

(71) Applicant: Edgar Hugo, Miami, FL (US)

(72) Inventor: Edgar Hugo, Miami, FL (US)

( * ) Notice: Subject to any disclaimer, the term of this patent is extended or adjusted under 35 U.S.C. 154(b) by 0 days.

(21) Appl. No.: 17/669,310

(22) Filed: Feb. 10, 2022

(51) Int. Cl.
*A47J 47/00* (2006.01)

(52) U.S. Cl.
CPC .................................. *A47J 47/005* (2013.01)

(58) Field of Classification Search
CPC ............ A47J 47/005; A47J 47/00; B23Q 3/00
USPC ........................................................... 30/124
See application file for complete search history.

(56) References Cited

U.S. PATENT DOCUMENTS

| | | | | |
|---|---|---|---|---|
| 6,409,138 B1 * | 6/2002 | Baccini | ................ | H05K 3/0097 |
| | | | | 248/346.02 |
| 10,342,387 B1 * | 7/2019 | Hugo | .................... | A47J 47/005 |
| 2004/0150151 A1 * | 8/2004 | Diermeier | ............. | A47J 47/005 |
| | | | | 269/289 R |
| 2020/0288916 A1 * | 9/2020 | Berndt | .................... | A47J 36/04 |
| 2021/0393085 A1 * | 12/2021 | Sulik | .................... | A47J 47/005 |

\* cited by examiner

*Primary Examiner* — Phong H Nguyen
(74) *Attorney, Agent, or Firm* — Chistpher J. Vandam, P.A.; Chris Van Dam

(57) ABSTRACT

A cutting board having removable grommet feet that protrude entirely through the upper and lower surface of a cutting board. The bottom of the grommet assembly includes a concave recess below the board. The top of the grommet assembly has a convex head above the board. Multiple boards may be stacked wherein the recess of an upper board fits over the head of the lower board providing a stable stacking configuration and ensuring separation between the boards allowing airflow between adjacent, stacked boards. The head of the grommet assembly is supple to push through an aperture or cut out in the board surface for installation and removal.

3 Claims, 5 Drawing Sheets

CUTTING BOARD

CROSS-REFERENCES TO RELATED APPLICATIONS

None.

STATEMENT REGARDING FEDERAL SPONSORED RESEARCH OR DEVELOPMENT

None.

NAMES OF PARTIES TO A JOINT RESEARCH AGREEMENT

None.

REFERENCE TO A "SEQUENCE LISTING", A TABLE, OR A COMPUTER PROGRAM LISTING APPENDIX SUBMITTED ON COMPACT DISC AND INCORPORATION-BY-REFERENCE OF THE MATERIAL ON THE COMPACT DISCLOSURE

None.

STATEMENT REGARDING PRIOR DISCLOSURES BY AN INVENTOR OR JOINT INVENTOR

None.

BACKGROUND OF THE INVENTION

1. Field of the Invention

The present invention relates to kitchen cutting boards, and more particularly, to an improved cutting board with stackable feet.

2. Description of Related Art Including Information Disclosed Under 37 CFR 1.97 and 37 CFR 1.98

Several designs for cutting boards have been known in the past. None of them, however, includes a cutting board with a plurality of supple feet that are adapted to both to efficiently stack multiple cutting boards with airspace between and provide improved surface traction.

Applicant believes that the closest reference corresponds to U.S. Pat. No. 10,342,387 issued to Edgar Hugo on 9 Jul. 2019. However, it differs from the present invention, among other reasons, because the feet are adapted to stack on adjacent boards with airspace and has sanitary feet with features in the board adapted to remove and secure the feet and help keep the board stable on a work surface while in use.

Other patents describing the closest subject matter provide for a number of more or less complicated features that fail to solve the problem in an efficient and economical way. None of these patents suggest the novel features of the present invention.

A brief abstract of the technical disclosure in the specification and title are provided as well for the purposes of complying with 37 CFR 1.72 and are not intended to be used for interpreting or limiting the scope of the claims.

Without limiting the scope of the invention, a brief summary of some of the claimed embodiments of the invention is set forth below. Additional details of the summarized embodiments of the invention and/or additional embodiments of the invention may be found in the detailed description of the invention below.

BRIEF SUMMARY OF THE INVENTION

It is one of the main objects of the present invention to provide a cutting board that neatly stacks to allow airflow between adjacent boards that improves drying and sanitizing.

It is another object of this invention to provide a cutting board with removable feet for maintenance, repair and cleaning.

It is still another object of the present invention to provide a cutting board with supple, concave feet to better adhere to a countertop during use.

It is yet another object of this invention to provide such a device that is inexpensive to manufacture and maintain while retaining its effectiveness.

Further objects of the invention will be brought out in the following part of the specification, wherein detailed description is for the purpose of fully disclosing the invention without placing limitations thereon.

These and other embodiments which characterize the invention are pointed out with particularity in the claims annexed hereto and forming a part hereof. However, for a better understanding of the invention, its advantages and objectives obtained by its use, reference can be made to the drawings which form a further part hereof and the accompanying descriptive matter, in which there are illustrated and described various embodiments of the invention.

BRIEF DESCRIPTION OF THE SEVERAL VIEWS OF THE DRAWING

With the above and other related objects in view, the invention exists in the details of construction and combination of parts as will be more fully understood from the following description, when read in conjunction with the accompanying drawings in which.

DETAILED DESCRIPTION OF THE INVENTION

Figure 1:
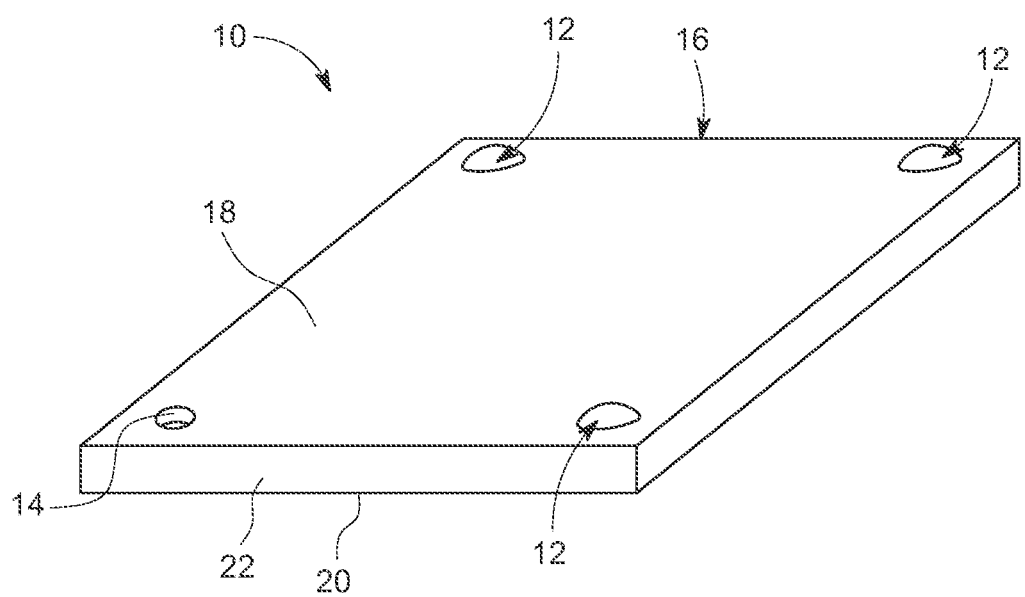
FIG. 1 shows a perspective view of a cutting board with one of the grommets removed.

While this invention may be embodied in many different forms, there are described in detail herein specific embodiments of the invention. This description is exemplary of the principles of the invention and is not intended to limit the invention to the particular embodiments illustrated and described.

For the purpose of this disclosure, like reference numerals in the figures shall refer to like features unless otherwise indicated or is obvious by context.

The subject device and method of use is sometimes referred to as the device, the invention, the board, the cutting board, the machine or other similar terms. These terms may be used interchangeably as context requires and from use the intent becomes apparent. The masculine can sometimes refer to the feminine and neuter and vice versa. The plural may include the singular and singular the plural as appropriate from a fair and reasonable interpretation in the situation.

Referring now to the drawings, where the present invention is generally referred to with numeral 10, it can be observed that it basically includes a grommet assembly 12, an aperture 14, a board assembly 16, an upper surface 18, a lower surface 20, an edge 22, a head 24, a central segment 26, a foot 28, a recess 30, a pad 32, a perimeter edge 34, a perimeter edge 36, a surface 38, a surface 40, a side wall 42, a channel 44, an aperture 46, a cut out 48, a mouth 50, a cut out 52, a mouth 54, an edge 56 and a reservoir 58.

FIG. 1 shows an example of a board assembly 16. The rectangular board assembly 16 includes an aperture 14 near each corner of the board assembly 14 that penetrate from the upper surface 18 through to the lower surface 20. A peripheral edge 22 surrounds the board. A grommet assembly 12 is inserted through each of the apertures 14. Slightly above the upper surface 18 of the board assemblies 16 protrude the domed top of the grommet assemblies 12. Below the lower surface 20 extends the foot 28.

In FIG. 1 it should be noticed that one grommet 12 is removed from the lower left aperture 14 to demonstrate the other three grommet assemblies 12 installed through the board as well as demonstrating the aperture 14 with the grommet assembly 12 removed. In one version of the board assembly 16, the grommet assemblies 12 are flexible enough to be removed from the respective apertures 14. This may be done to replace is damaged grommet assemblies 12 and also for cleaning the upper and lower surfaces 18 and 20 of the board assembly 16.

The grommet assemblies 12 may be fabricated from a supple and deformable material, such as rubber, silicone or other soft plastics. Because the grommet assemblies 12 are deformable, they are able to the fit through the apertures 14 and then spring the back into form when completely through thereby being secured within the aperture 14 through the board assembly 16.

Additionally, having the grommet assemblies 12 fabricated from a supple and deformable material, the foot 28 and associated recess 30 act as a suction cup to adhere the foot 28 onto the counter surface upon which the cutting board is resting. With slight pressure on the upper surface 18 of the board, the recess 30 in the foot 28 will deform slightly to expel air and retract creating a suction between the foot 28 and the counter surface. Because the foot 28 raises the lower surface 20 of the Board slightly off the counter surface it is easy to pry the edge 22 to remove the Board assembly 16 from the counter with minimal finger effort.

Figure 2:
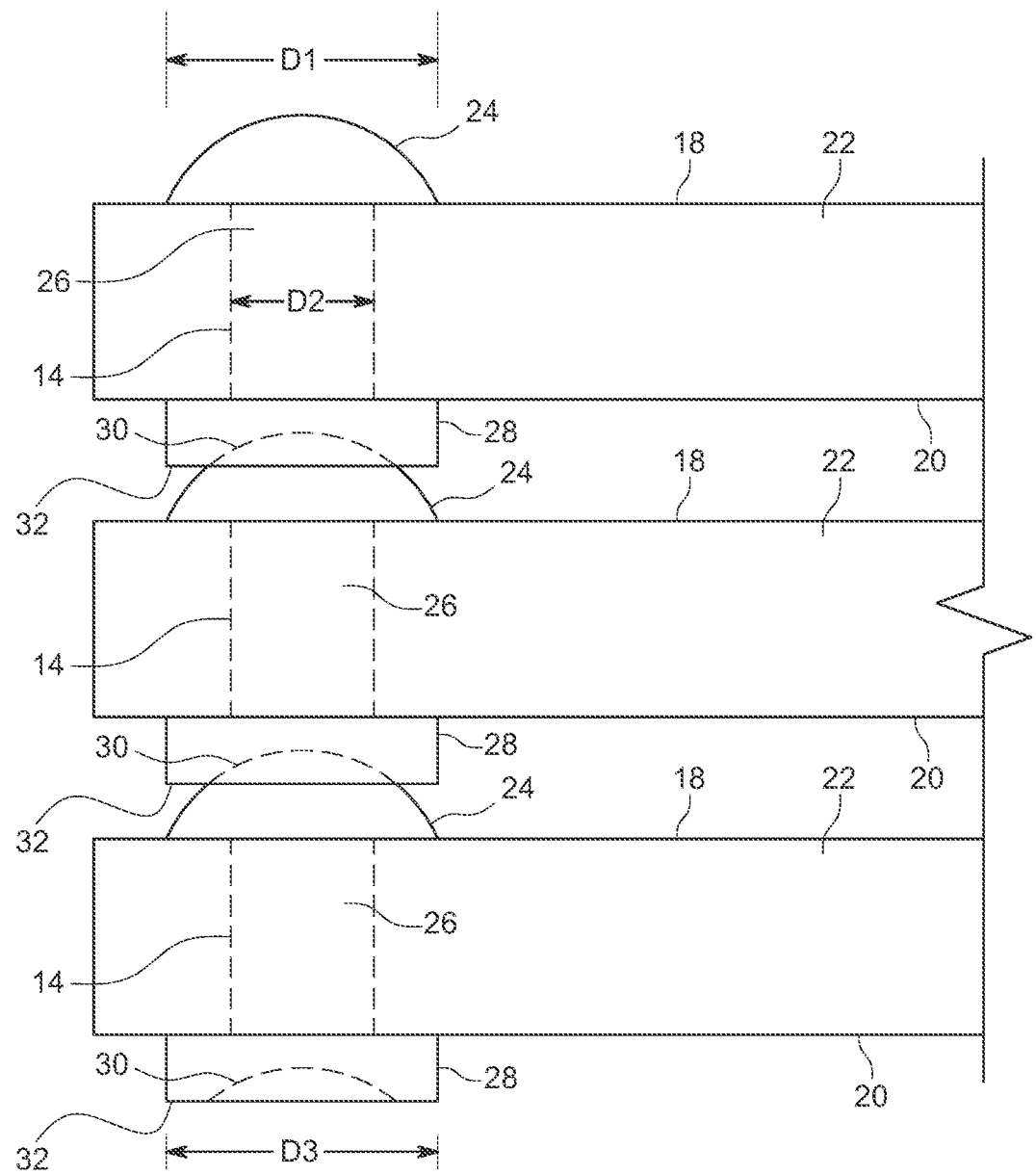
FIG. 2 shows a partial elevation of three stacked cutting boards, detailing how the boards stack.

FIG. 2 shows the grommet assemblies in more detail in addition to the stacking feature inherent in the geometry of the board assembly 16 and grommet assemblies 12. Generally, each grommet assembly 12 includes a central segment 26 between the head 24 and foot 28. To achieve the stacking feature of the boards, it is preferred to have each of the grommet assemblies 12 in all of the boards in a set to be substantially identical so they mate with adjacent boards.

The head 24 is generally dome shaped and has a diameter dimension D1. A lower surface 40 of the head is flat and around a periphery 34 is intended to seat onto the upper surface 18 of the board assembly 16. The central segment 26 is, in one version of the device, cylindrical with diameter dimension D2 that is substantially similar to the bore diameter of the apertures 14.

The foot 28 has a flat upper surface 38 that mates flush against the lower surface 20 of the board assembly 16. A bottom of the foot 28 has a pad 32 around the periphery and a domed recess 30 in a central area. The distance be between the bottom, flat surface 40 of the head 24 and the upper, flat surface 38 of the foot 28 is substantially the same as the thickness of the board assembly 16, so that the grommet assembly 12 fits snugly and securely inside the respective aperture 14.

The cross sectional radius of the head 24 is complementary to the cross sectional radius of the recess 34 of the foot 28. When multiple boards are aligned and stacked, as shown in FIG. 2, the head 24 of a lower board nests securely into the recess 34 on the foot 28 of the board stacked above it. The supple character of the grommet assemblies 12 ensures that the stacked boards fit quietly and securely together for storage and drying.

It should be appreciated that the mating head 24 and corresponding recess 30 provide an air space between stacked boards in storage. This allows a set of several cutting boards to be stacked wet and to naturally dry to maintain sanitation by drying quickly and completely. There is essentially no limit as to how many copies of the cutting board may be stacked in this fashion.

In one version of the grommet assembly 12 design, the diameter D1 of the head 24 is slightly less than the diameter D3 of the foot 28. This may help the deformable grommet assembly 12 to be removed from the board by pressing down from the top at the upper surface 18. Then reinstalling the grommet assembly 12 is easily achieved by pressing the head 24 through the aperture 14 through the lower surface 20 of the board and separating the grommet from the board.

In one version of the cutting board, the diameter dimension D3 of the foot 28 may be substantially larger than the diameter D1 of the head 24. This prevents the foot 24 from inadvertently slipping up through the aperture 14 when pressure is applied to the upper surface 18 of the cutting board during typical use. Where dimension D3 is substantially greater than dimension D1, to remove the grommet assembly 12, the head 24 is deformed to fit through diameter dimension D2 of the aperture 14 and the grommet assembly 12 is removed through the lower surface 20 of the board assembly 16.

Similarly, when reinstalling this version of grommet assembly 12, the head 24 is pushed through the aperture at the lower surface 20 and emerges through the upper surface 18 and the flat, lower surface 40 of the head 24 naturally springs back to secure the grommet assembly 12 in the aperture 14.

Because the head assembly 20 rises above the upper surface 18 of the board assembly 16, it may become nicked, stained or otherwise damaged. Since the grommet assemblies 12 are generally identical to each other, replacement grommet assemblies 12 may be provided with the cutting board.

Figure 3:
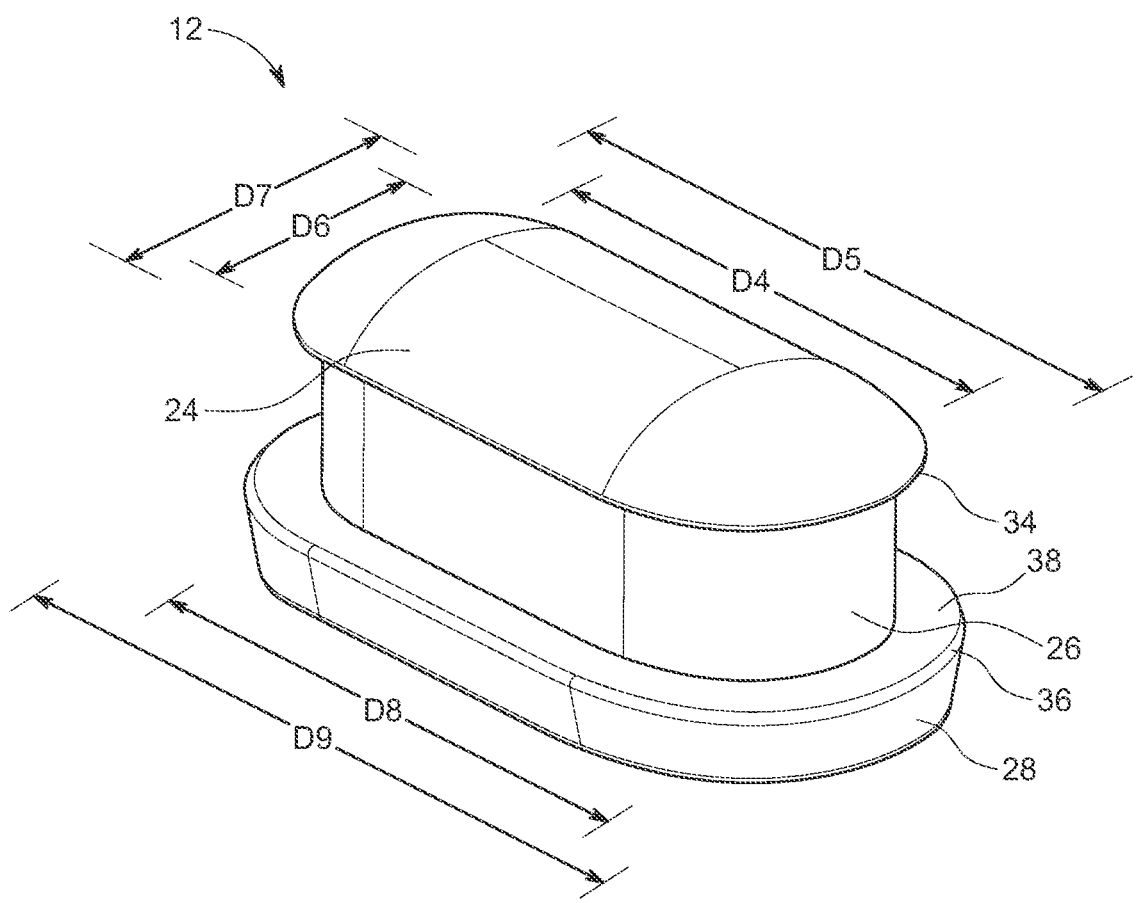
FIG. 3 is a perspective view of a top side of a grommet assembly.
Figure 4:
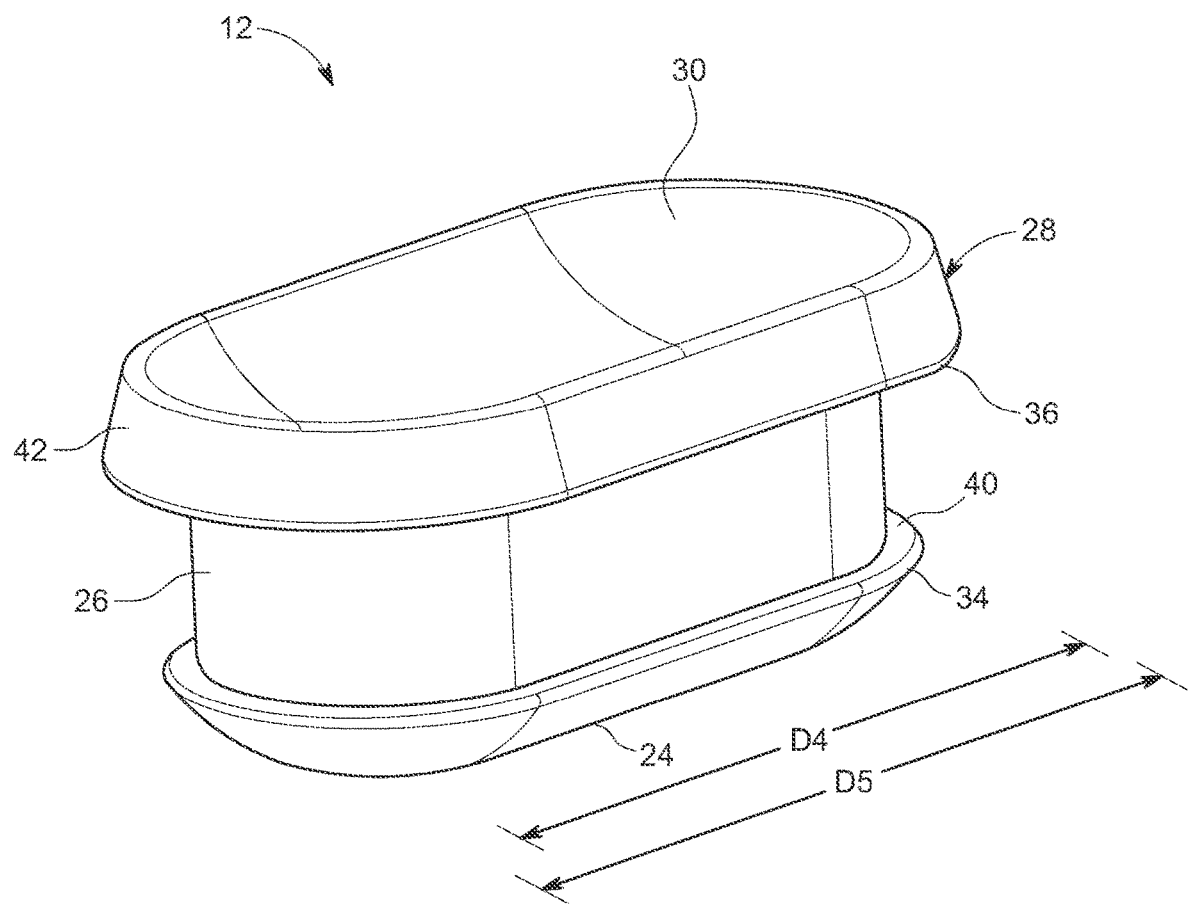
FIG. 4 is a perspective view of a bottom side of the grommet assembly shown in FIG. 3.

FIGS. 3 and 4 show and alternate version of a grommet assembly 12. Generally, this version of grommet assembly 12 has a central segment 26 with an oblong cross-section. This is in contrast to the cylindrical central segment 26 shown in FIGS. 1 and 2. For this type of grommet assembly 12, the apertures 14 should have a corresponding geometry to the oblong central segment 26.

In FIGS. 3 and 4, the commonalities of all of the grommet assembly 12 variations can be seen in more detail. The alphanumerical "D" designation in the drawings generally refers to "dimension" and may also refer to diameter for shape profiles where appropriate. The representative is dimensions in the drawings should not imply a strict proportionality, but instead are illustrative of an effective example of a grommet assembly 12. The relative dimensions should be apparent from the drawings and discussion herein and determined in light of the board to which the grommets will be mated.

The recess 30 on the bottom of the foot 28 is concave to result in a suction cup-like feature when the board is placed onto a surface, such as a countertop. Additionally, the concave recess 30 is also dimensioned and adapted to fit over the head 24 with a similar, complementary profile when stacked. The head 24 is convex to both nest into the recess 30 of a second board stacked on top of a first board as well as to shed liquid when the cutting board is being used to prepare food.

Generally, to achieve the stacking feature, as exemplified in FIG. 2, identically sized cutting boards with identical styles of grommet assemblies 12 are used. It is important when stacking multiple boards that the grommet assemblies 12 be positioned in the same location and are of the same size so that all of the feet on one board match and mate into the heads of a board below, resulting in a secure stack of boards.

When multiple boards are stacked with all feet nesting into the head of the corresponding grommets below, a uniform air space is created between the boards. This facilitates a rapid drying of the boards to improve sanitation. It also results in a stable stack a boards that can be compactly stored and then picked up by a chef before use.

The upper side of the foot 28 includes a flat surface 38. When the grommet assembly 12 is inserted into an aperture 14 or cut out, such as the cutouts 48, 52 or aperture 46, as demonstrated in FIG. 5, the surface 38 is secured firmly against the lower surface 20 of the board assembly 16. Simultaneously, the surface 40 on the underside of the head 24 is flat and presses a firmly against the upper surface 18 of the board assembly 16 when inserted into any of the complimentary dimensioned apertures or cutouts.

The perimeter edge 36 of the foot 28 has a profile larger than the aperture or cut out into which it is inserted. The surface 38 and corresponding perimeter edge 36 should be sufficiently large that there is little risk of the grommet assembly 12 being pulled through the board assembly 16 during typical use of the board.

The perimeter edge 34 surrounding corresponding surface 40 may be slightly smaller than the surface 38 and perimeter edge 36 on the foot so that the grommet assembly 12 can be pushed through the lower surface 20 of the board assembly 16 with modest deformation of the head 24. Since the working pressure applied to the upper surface 18 of the board during use is greater, the entire weight of the board assembly 16 rests on the surface 38 and therefore the surface 38 should be sufficiently large to prevent the foot 28 from pushing through the aperture or cut out from the lower surface 20 is of the board assembly 16.

The dimension D6 represents the width of the central segment 26. The dimension D4 represents the length of the central segment 26 oriented perpendicular to dimension D6. Generally, the corresponding aperture 14, aperture 46, cut out 48 or cut out 52, whichever is used in that style of cutting board, will have dimensions materially similar to D4 and D6 in the respective axes.

Generally, the side wall of the apertures or cutouts are perpendicular to the plane of the upper surface 18 of the board assembly 16. However, the side wall of the apertures or cutouts may also be tapered, with a corresponding taper in the central segment 26. This may serve to define the upper surface 18 and lower surface 20 of the board assembly 16, thereby ensuring that the grommet assemblies 12 are only inserted from the lower surface 20 of the board assembly 16.

A tapered aperture or cut out may be preferred where juice the channels 44 are present. Conversely, an aperture or cut out perpendicular to the upper surface 18 of the board assembly 16 may be preferred so that the grommet assemblies 12 may be inserted through the board in reverse to exchange the upper surface 18 for the lower surface 20 if the upper surface 18 is showing staining or wear from use.

Dimension D5 is one axis of the head 24 of the grommet assembly 12. D7 is the axis of the head 24 perpendicular to D5. The difference between dimension D4 and D5 is the width of the surface 40 of the head 24 in that respective axis. The difference between dimension of D7 and D6 is the width of the surface 40 of the head 24 in that respective axis.

With a dimension D5 greater than dimension D4 and dimension D7 greater than D6, a flat surface 40 is provided that rests upon the upper surface 18 of the board assembly 16. The surface 40 should not be too great to prevent the insertion of the head 24 through the respective aperture or cut out. The suppleness of the head 24 will allow it to deform while being pressed through the aperture 14 and then when the head 24 protrudes sufficiently through the aperture or cut out at the upper surface 18 of the board assembly 16 it springs back to its original size with the surface 40 contacting the upper surface 18.

Similarly, the difference between dimension D9 and D8 define the dimension of the surface 38 that extends beyond the aperture or cut out on the lower surface 20 of the board assembly 16. Generally, the surface 38 is flat and when the grommet assembly 12 is inserted into the board assembly, the surface 38 is mated snugly against the lower surface 20 of the board assembly 16.

The dimension of the surface 36 may be larger than the surface 40 because the foot 28 does not need to deform to fit through an aperture or cut out. Preferably, the foot 28 will not be able to be pushed through the is aperture or cut out regardless of how much pressure is applied between the lower surface 20 and the surface 38.

The side wall 42 of the foot 28 has a vertical dimension to raise the board assembly 16 off of the countertop when in use. The side wall 42 also extends the distance between adjacent boards when in a stacked configuration, as demonstrated in FIG. 2. Side wall 42 also provides a volume within which to form the recess 30 in the foot 28.

Figure 5:
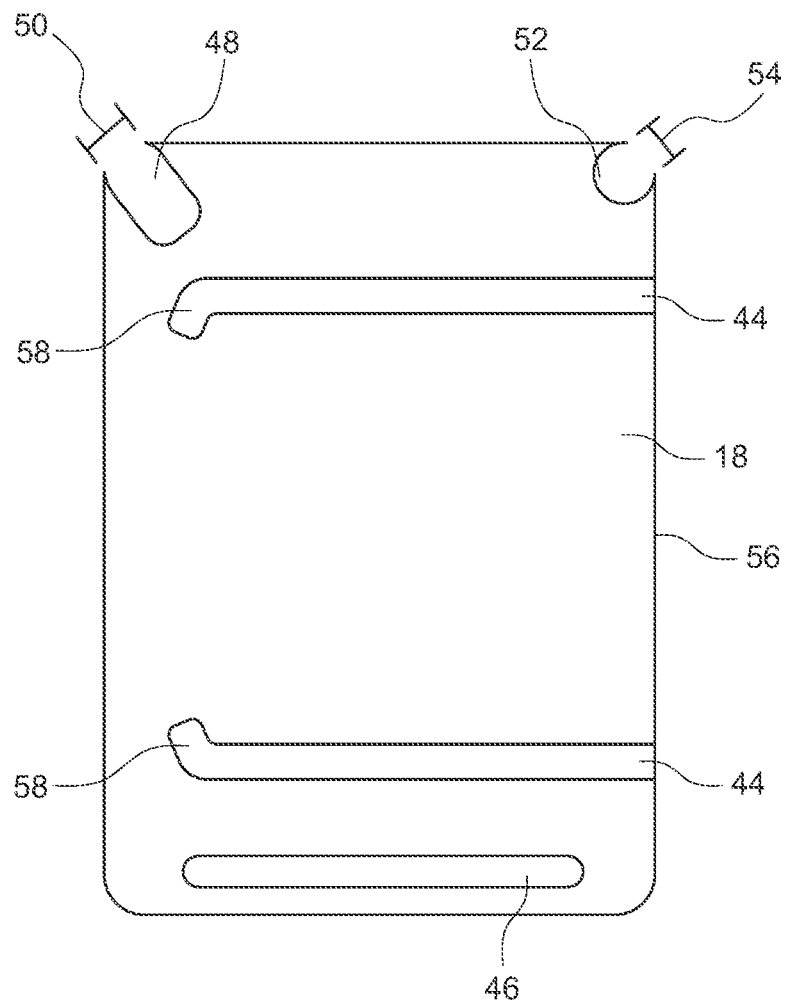
FIG. 5 is a top plan view of a cutting board showing several alternate an optional features.

Looking now at FIG. 5, optional features of the cutting board are demonstrated. Generally, only one type of aperture or cut out is used in each of the edges of any single board. FIG. 5 demonstrates alternate versions of the cutouts and aperture that are all within the inventive scope of the cutting board. FIG. 5 is not intended to suggest that different types or sizes of apertures, cutouts or grommet assemblies would be used in any single board. Preferably, each grommet assembly and respective aperture or cut out in each board, as well as a set of cutting boards, would be identical to permit efficient stacking of the board's as shown in FIG. 2.

A grommet assembly 12, such as the oblong version shown in FIGS. 3 and 4, may be suitable for a cut out 48 where a section of the perimeter of the cut out 48 coincides with the edge 56 of the board. The mouth 50 of cut out 48 is slightly narrower than the dimension D6 so that when the grommet assembly 12 is inserted into the cut out 48 the mouth 50 essentially pinches around the central segment 26 securing the grommet is assembly 12 within the cut out 48. It should be appreciated that an oblong grommet assembly 12 may also be put into an aperture entirely within the perimeter edge 56 of the board assembly, similar to the ground apertures shown in FIG. 1.

Cut out 52 also has a segment of the cut out that intersects the edge 56 of the board assembly 16. The mouth 58 is slightly narrower than dimension D2 of a circular-style grommet assembly 12. With cut out 52, a circular grommet may be either pushed through the bottom side of the board assembly 16 similar to the through aperture 14 as shown in FIG. 1 or the central segment 26 may be pushed through the mouth 54. By nature of the mouth 54 being slightly narrower than the dimension D2 of the central segment 26 the corners of the mouth essentially clip or grasp the grommet assembly 12 into the cut out 52.

Aperture 46 is another example of an aperture completely through the upper surface 18 and lower surface 22 of the board assembly 16. Aperture 46 is dimensioned to have an axis dimension D8 multiple times longer than the axis defined by dimension D6. Axis dimension D8 is sufficiently large to span a substantial length of an edge of the board assembly 16 so that only two grommet assemblies may be used to support the board assembly 16, one on each of the opposing parallel edges of the board assembly 16. The remaining features and performance, such as the suppleness of the head 24 and the concavity of the recess 30 and convex head 24, remain true for an elongated grommet assembly adapted to fit is inside an elongated aperture 46.

Optionally, one or more juice channels 44 may be formed into the upper surface 18. The juice channels 44 allow liquid to drain from the upper surface 18 into the recess channel 44. The channels 44 may be sloped so that liquid that drains into the channel 44 is directed toward a deeper reservoir 58 at the end of each channel 44. Similarly, if the reservoirs 58 are not present, the channels 44 may be sloped to drain the liquid collected in channel 44 off of the edge 56 of the board assembly 16.

A version of the cutting board can be fairly described as a cutting board with a plurality of identical grommet assemblies. In one version each of the four corners of the cutting board may have its own grommet with the respective aperture or cut out. In other versions there may be an elongated aperture wherein the apertures are positioned along opposite parallel edges of the cutting board. The apertures or cutouts pass entirely through the board from an upper surface to a lower surface. A grommet assembly is provided for each aperture or cut out. It should be appreciated that the cut out and aperture are intended to be interchangeable in the specification and claims because both perform materially similar functions.

Each of the apertures and cut out styles shown in the drawings and described herein equally hold a grommet assembly with the convex head above the board and concave recess below the board. Generally, each grommet is comprised of a head, a central segment and a foot. The upper is side of the head is convex and is above the upper surface of the board. A lower side of the foot of the grommet assembly is concave and is provided below the lower surface of the board. The concave foot is dimensioned to complement the convex upper side of the head so that when the boards are stacked the head of the lower board fits into the recess of the upper board. An upper surface of the foot is flat and is larger than the aperture so that when the foot is installed through the aperture the upper flat surface of the foot rests firmly against the lower side of the board and is resistant to pushing through the board from the lower side. The lower surface of the head is flat and is also larger than the aperture. However, the head is designed to be able to be pushed through the upper and lower surface of the board under a predetermined amount a pressure to install and remove the grommet assembly. Generally, finger pressure by a user should be able to produce sufficient pressure to be able to deform the head to install or remove the grommet assembly from the board. When the grommet is installed in the board the lower surface of the head rests on the upper surface of the board and the upper surface of the foot rests on the lower surface of the board, securing the grommet assembly to the cutting board. Optionally, the aperture may intersect and bisect a perimeter edge of the board. In this version, the cut out has a mouth with a slightly smaller dimension than the central segment of the grommet so that the grommet remains pinched within the aperture/cut out. In this way an edge of the central segment may be exposed outside the corner of the edge of the board. Optionally, the aperture may be entirely within the perimeter edge of the board.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

I claim:

1. A cutting board comprising:
   a board and a plurality of identical grommet assemblies;
   wherein the board includes an upper surface and a lower surface;
   wherein a plurality of apertures are provided on the board and extend entirely through the board; and
   wherein a grommet assembly is provided for each aperture;
   wherein the grommet assembly includes a head, a central segment and a foot;
   an upper side of the head is convex and is completely unbroken;
   a lower side of the foot is completely unbroken, concave and is dimensioned to complement the convex upper side of the head;
   the lower side of the foot is sufficiently supple and deformable to suction-cup onto a surface upon which the cutting board is placed;
   an upper surface of the foot is flat and is larger than the aperture;
   a lower surface of the head is flat and is larger than the aperture;
   the central segment has a cross-section matching the aperture and without an axial aperture; and
   wherein the head of the grommet assembly deforms when pushed through the aperture from the lower surface of the board and the lower surface of the head seats against the upper surface of the board around the aperture and the upper surface of the foot seats against the lower surface of the board around the aperture; and
   the upper surface of the foot is larger than the lower surface of the head and larger than the aperture so that the foot cannot pass through the respective aperture.

2. The cutting board of claim 1 wherein a segment of the aperture bisects a perimeter edge of the board.

3. The cutting board of claim 1 wherein the aperture is entirely within a perimeter edge of the board.

* * * * *